Sept. 6, 1932.                W. D. SMITH                1,875,513
                   THERMOSTATIC CONTROL FOR VALVES
                         Filed Aug. 14, 1931
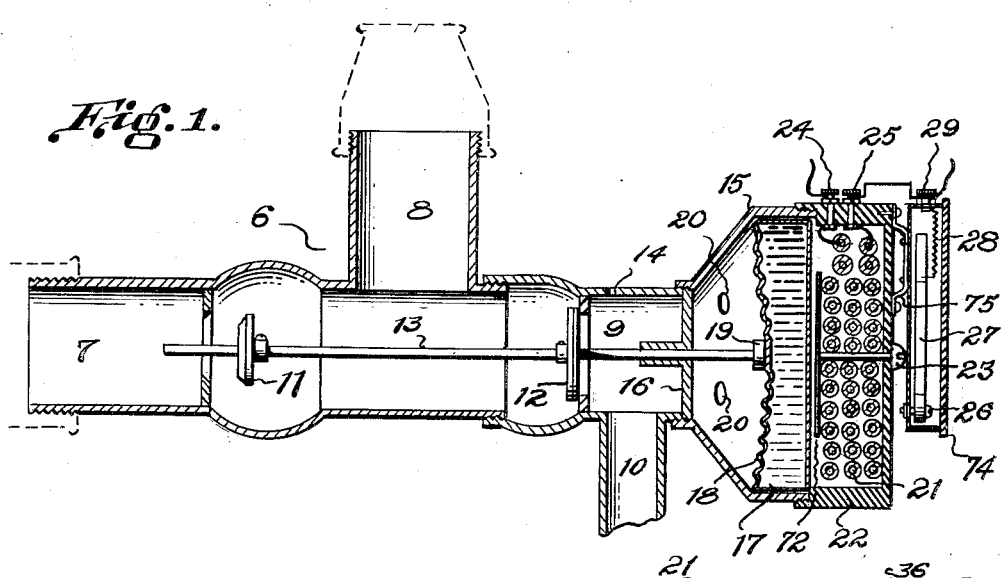
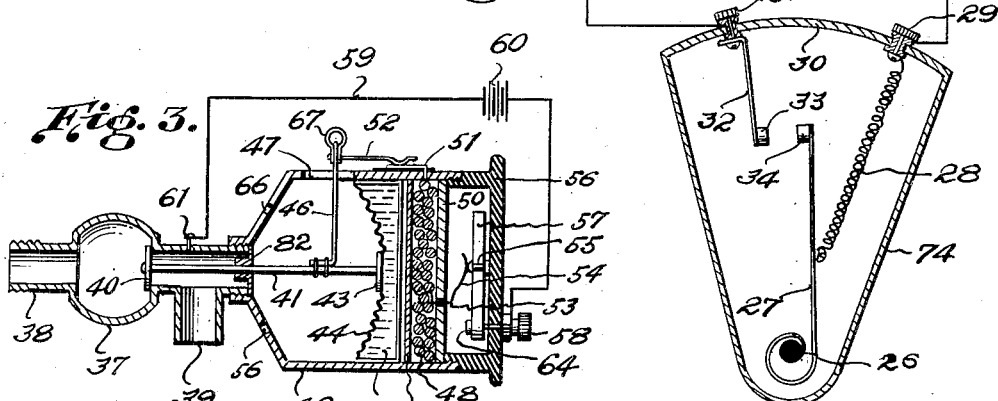
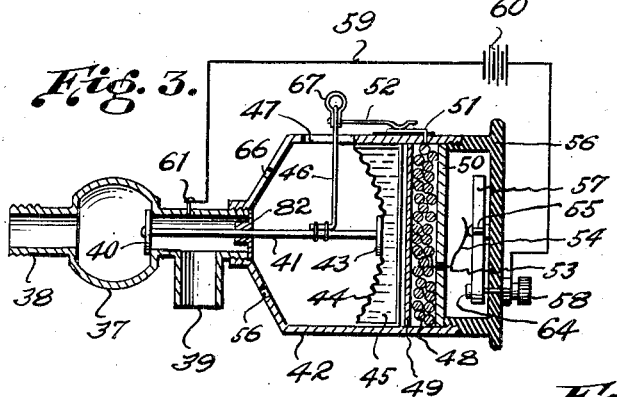
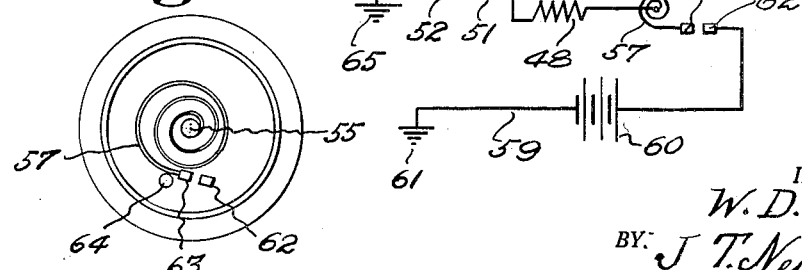
INVENTOR:
W. D. Smith
BY: J. T. Newton
ATTORNEYS.

Patented Sept. 6, 1932

1,875,513

UNITED STATES PATENT OFFICE

WILLIAM DOUGLAS SMITH, OF LUMBER BRIDGE, NORTH CAROLINA, ASSIGNOR OF ONE-FOURTH TO ARTHUR D. MALLOY AND ONE-FOURTH TO LEIGHTON SMITH, BOTH OF QUITMAN, GEORGIA

THERMOSTATIC CONTROL FOR VALVES

Application filed August 14, 1931. Serial No. 557,189.

This invention relates to improvements in thermostatic controls for valves, operating automatically to discharge water from a container to prevent freezing. Such devices are employed to prevent freezing of water in the service pipes of dwellings, in radiators of automobiles and in tanks exposed to freezing temperatures. The object of the present invention is to improve in certain respects the construction and operation of such devices, as hereinafter described, pointed out in the appended claims and illustrated by the accompanying drawing.

In the accompanying drawing, in which similar reference characters designate corresponding parts, Figure 1 is a longitudinal sectional view of one embodiment of the invention.

Figure 2 is a detail view, showing the thermostatic control element and a diagram of the circuit for the electric heater.

Figure 3 is a longitudinal sectional view of a second embodiment of the invention.

Figure 4 is a detail view showing the thermostatic control element of the second embodiment of the invention.

Figure 5 is a diagram of the circuit for the electric heater in the second embodiment.

Referring more particularly to Figs. 1 and 2 of the drawing, 6 designates generally a coupling, of which an arm 7 communicates with a water-supply pipe, an arm 8 communicates with a service pipe at a low point in the latter, and an arm 9 communicates with a drain-pipe 10. The passages through the supply arm 7 and the drain arm 9 are controlled by the valves 11 and 12, respectively. These valves are mounted on a common stem 13 and their operation is such that when one valve is closed the other valve is open. With the valve 11 open and the valve 12 closed, as shown in Fig. 1, communication is established between the supply arm 7 and the service arm 8, and communication through the drain arm 9 is closed, so that water flows from the supply pipe to the service pipe. With the positions of the valves reversed, the supply of water is cut-off from the service pipe and communication is opened from the service pipe through arms 8 and 9 with the drain pipe 10 to discharge the water from the service pipe. In the upper part of the arm 9 is a vent 14 to permit seepage of air therethrough during the discharge to prevent hanging of water in the pipe.

A thermostatic control is provided for actuating the valves under varying conditions of temperature. On the outer end of the coupling arm 9 is mounted a casing 15 comprising a conically shaped inner part and a cylindrically shaped outer part. The inner side of the casing is closed by the partition 16, separating it from the coupling arm 9. The casing is coaxial with the coupling and alined with axis of these parts is the valve stem 13 extending through the partition 16. Fitting in the cylindrical part of the casing 15 is the closed cylindrical container 17 having an expansible diaphragm 18 forming its inner side. This diaphragm is centrally welded to the nut 19 in which is threaded the end of the valve stem 13. The container 17 is completely filled with alcohol, or other volatile liquid that will not freeze at low temperatures. Under normal conditions of temperature, below the point at which it volatilizes, there is but little change in the bulk of the alcohol. In this condition of the alcohol, the position of the diaphragm is such as to close the valve 12 tightly on its seat to close the passage from the coupling to the drain pipe 10. Should the alcohol be subjected to a temperature sufficiently high to volatilize it, then its bulk would be greatly increased, to such an extent as to force the diaphragm outwardly from the container. This movement of the diaphragm, actuating the rod or stem 13, would tightly close the valve 11 on its seat and open the valve 12. This action of the valves would close the communication through the supply arm 8 of the coupling and would open the communication through the drain arm 9, thereby cutting off the water supply to the service pipe and permitting the water remaining in the service pipe and its connections to discharge through the drain pipe 10. In the conical part of the casing 15 are openings 20 to permit the passage of air therethrough during the movement of the diaphragm.

An electric heater is provided for heating the alcohol should the temperature of the surrounding air drop below the freezing point of water. This heater comprises, primarily, a coil of insulated wire 21 contained in the cap 22, formed of insulating material, threaded onto the outer end of the casing 15. The coil is clamped between the head of the cap and the plate 72 by the screw 23 passing through the opposite members and the ends of the coil are respectively connected with the binding ports 24 and 25 mounted in the wall of the cap. On the exterior of the cap is mounted an auxiliary casing 74, the latter being fast to the bracket 75 attached to the cap. The auxiliary casing is of segmental shape and adjacent the angle of its two diverging sides a pin 26 is fixed in the wall of the casing and insulated therefrom. On this pin is fixed an end of the thermostatic element 27, formed of metal strips having different coefficients of expansion and contraction when subjected to changes of temperature. This thermostatic element is electrically connected by the coiled spring 28 with the binding post 29 mounted in the curved upper wall 30 of the auxiliary casing. A second binding post 31 is also mounted in the curved wall 30 and is electrically connected with the metal arm 32, which carries at its free end a contact 33 opposite to the contact 34 carried by the thermostatic element 27. The binding posts 29 and 31 are connected by the wiring 35 including the battery 36 and the heating coil 21, thereby forming a circuit having its terminals at the contacts 33 and 34, which complete the circuit when brought together.

The composition and arrangement of the thermostatic element 27 are such that while the temperature adjacent to the auxiliary casing 74 remains above freezing the element holds the contacts 33 and 34 in separated relation and no current passes through the heating coil 21. Should the temperature adjacent to the auxiliary casing drop below freezing, or any other predetermined point to which the device is adjusted, then the thermostatic element is actuated to press together the contacts 33 and 34, completing the circuit through the battery and the heating coil, thereby heating the container 17 and volatilizing the alcohol therein. The expansion of the alcohol forces outward the diaphragm 18 which in turn actuates the rod or stem 13 to close the valve 11 and to open the valve 12, thereby cutting off the water supply and opening the service pipe to the drain pipe. The valves remain in this positon so long as the circuit through the heater is maintained. Should the temperature adjacent to auxiliary casing rise sufficiently, then the thermostatic element 27 would separate the contacts 33 and 34 to open the circuit, thereby permitting the heater to cool and also the alcohol, resulting in the condensation of the latter. The condensation of the alcohol tending to create a vacuum in the container 17, air entering the casing 15 through the ports 20 would press the diaphragm back to its original position. This movement of the diaphragm would open the valve 11 and close the valve 12, thereby closing the service pipe to the drain pipe and opening it to the supply pipe.

The embodiment of the invention illustrated by Figs. 3-5 is particularly adapted to the drainage of tanks, automobile radiators and the like. In this embodiment there is no connection with a water supply and the coupling 37 is provided with a threaded nipple 38 to be turned into a discharge opening at the lowest part of the tank or radiator. Leading from the under side of the coupling is the drain pipe 39, the passage to which it is controlled by the valve 40 carried by the rod 41 passing through the partition 82 at the inner end of the casing 42. In its general construction this casing 42 is similar in construction to the main casing 15 of the former embodiment of the invention. The inner end of the rod 41 carries a disc 43 that abuts the diaphragm 44 of the alcohol container 45, similar to the container 17 of the first embodiment. In this instance the disc 43 is not welded to the center of the diaphragm. On the rod 41 is fixed an arm 46 extending through a longitudinal slot 47 in the wall of the casing 42. The purpose of this arm will be explained further on.

In the outer end of the casing 42 is the heating coil 48 positioned between the two plates 49 and 50 secured in the casing. One end of the heating coil is electrically connected with the contact plate 51 fixed on the exterior of the casing 42 and insulated from the latter. Slidable on this contact plate is the contact blade 52 fixed to the outer end of the arm 46. The other end of the heating coil is electrically connected with the inner end of the pin 53 extending through the plate 50 and insulated therefrom. The other end of the pin 53 is electrically connected with the blade 54 bearing on the head of the pin 55, seated in the inner side of the cap 56 of insulating material. This cap is threaded in the outer end of the main casing 42 and forms an auxiliary casing therewith. Within this auxiliary casing is mounted the thermostatic element 57, also formed of strips of metal having different coefficients of expansion and contraction when subjected to variations in temperature. One end of this element is fixed to the pin 55, and electrically connected thereby with the heating coil 48. A wiring 59, including the battery 60, is electrically connected at one end with the binding post 58 and at the other is grounded in the metallic casing 42, as at 61. On the inner end of the binding post 58 is a contact 62 opposite to the contact 63 on the free end of the spiral thermostatic element 57.

The free end of the thermostatic element rides on the post 64 to guide the contact 63 with relation to the contact 62.

With the contacts 62 and 63 closed, the electric circuit is complete from the grounding 61, through the wiring 59 and the battery 60, the binding post 58, contacts 62—63, thermostatic element 57, pin 55, blade 54, pin 53, heating coil 48, switch contact 51 and blade 52, and grounded through the arm 46, as at 65.

In the normal condition of this control, the valve 40 is closed and the switch members 51—52 are in contact, but the circuit is open by the separation of the contacts 62—63. When the temperature drops below the predetermined point, the thermostatic element 57 is actuated to force together the contacts 62—63, thereby closing the circuit through the battery 60 and the heating coil 48. The heat from the coil vaporizes the alcohol in the container 46 and the diaphragm 44 is forced outwardly, thereby moving the rod 41 to open the valve 40 so that the liquid can drain from the tank or radiator through the coupling 37 and the pipe 39. In this movement of the rod 41, the arm 46 moves the switch blade 52 off the contact plate 51 to open the circuit. As the heater 48 cools the alcohol condenses in the container 45 and outside air entering through the ports 66 in the casing 42 forces the diaphragm 44 back to its original position. As the rod 41 is not attached to the diaphragm it remains in the position to which it was moved by the previous action of the diaphragm and the valve 40 remains unseated. The purpose of opening the circuit by the switch 51—52 after the opening of the valve is to prevent unnecessary exhaustion of the battery. If the controlling device is mounted on the radiator of an automobile, for an instance, left out of doors on a cold night, continued low temperature might cause the thermostatic element to close the contacts 62—63 for a long period and there would be a needless flow of current if the circuit remained intact. By the provision of the switch 51—52 the circuit is broken immediately after the drain valve is opened and subsequent flow of current is prevented. Previous to refilling the radiator or tank, the outer end of arm 46 can be grasped by the operator to close the valve 40 and also the switch 51—52. As the temperature rises the thermostatic element is actuated to separate the contacts 62—63 to open the circuit. The switch blade 52 is mounted on the knob 67 swivelled on the upper end of the arm 46. Should the temperature remain at a point below that at which the contacts 62—63 are closed by the thermostatic element, the switch blade 52 can be turned by the knob 67 out of contact with the plate 51, thereby breaking the circuit which might otherwise be closed by the thermostatic element. When it is desired to reset the device the switch blade can be readily turned by the knob to contact with the plate 51 to complete the circuit at that point, so that the control by the thermostatic element would be effective.

What I claim is:

1. In a thermostatic control for valves, the combination of a valve having a stem, with a closed container for a volatile liquid, an expansible diaphragm forming one of the walls of the container and abutting the outer end of the valve stem, an electric heater adjacent to the container to vaporize the liquid therein to bulge the diaphragm to push the abutting valve stem to actuate the valve, an element responsive to temperature changes for controlling the circuit of the electric heater, and a switch actuated by the movement of the valve stem for opening the circuit.

2. In a thermostatic control for valves, the combination of a pipe-coupling having extensions to form respectively connections for supply, service and drain pipes, a valve controlling the communication between the supply and service connections and a second valve controlling the communication between the service and drain pipe connections, a stem common to both valves with the latter arranged so that when one is opened the other is closed, a closed container for a volatile liquid, an expansible diaphragm constituting one of the walls of the container and attached to the valve stem, an electric heater adjacent to the container to vaporize the liquid therein to bulge the diaphragm to actuate the valve stem to close one of the valves and to open the other, the diaphragm responding to atmospheric pressure to return to its initial position on condensation of the vaporized liquid in the container, the return movement of the diaphragm actuating the valve stem to reverse the positions of the valves, and an element responsive to temperature changes for controlling the electric circuit of the heater.

3. In a thermostatic control for valves, the combination of a pipe-coupling including a drain extension, a valve controlling the passage through the coupling to the drain extension, a stem for the valve extending outside of the coupling, a closed container for a volatile liquid, an expansible diaphragm forming one of the walls of the container and abutting the outer end of the valve stem, an electric heater adjacent to the container to vaporize the liquid therein to bulge the diaphragm to push the abutting valve stem to open the valve to establish communication through the coupling and the drain connection, and an element responsive to temperature changes for controlling the circuit of the electric heater.

In testimony whereof I affix my signature.

WILLIAM DOUGLAS SMITH.